United States Patent Office 2,700,641
Patented Jan. 25, 1955

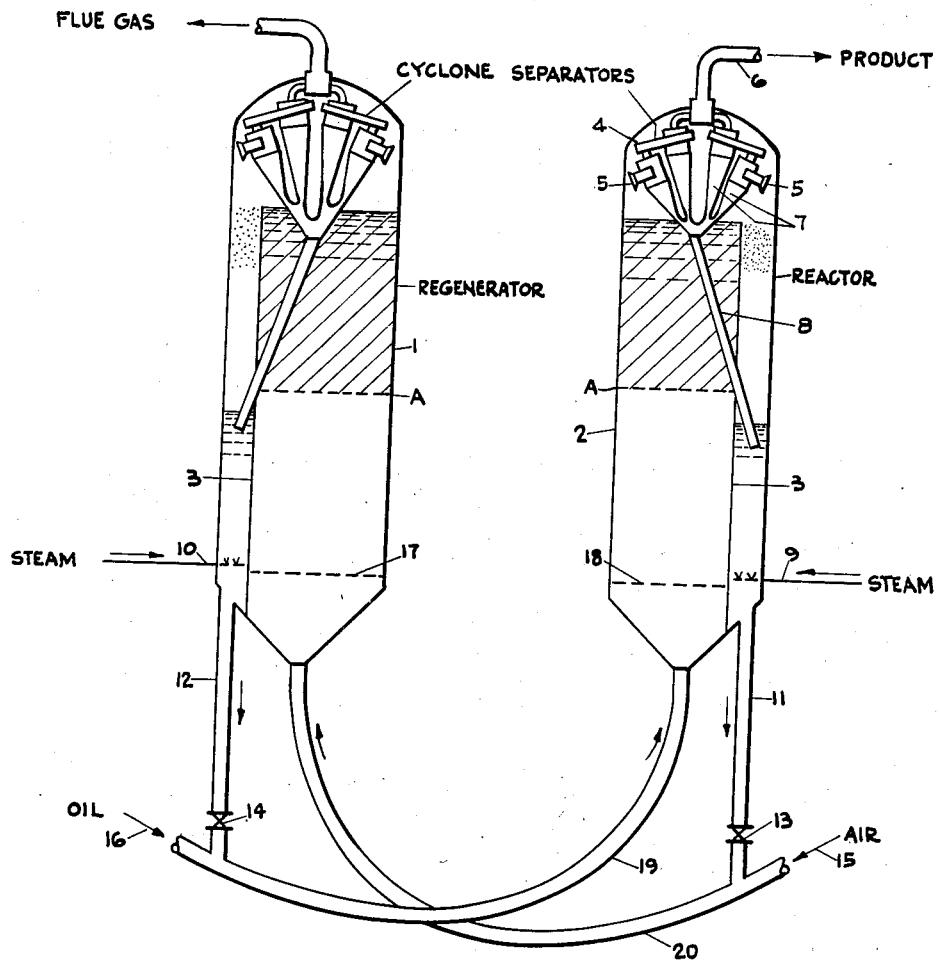
Fig. I
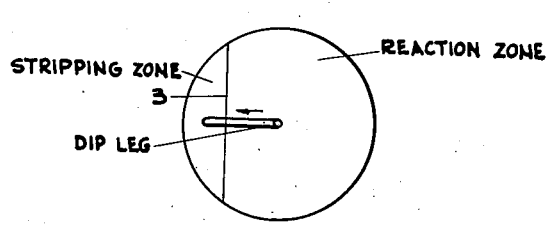
Fig. II
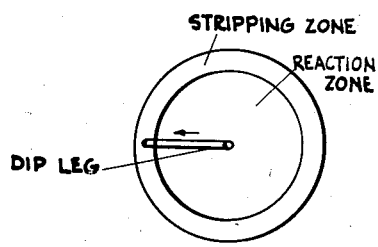
Fig. III
Inventor: Charles A. Rehbein

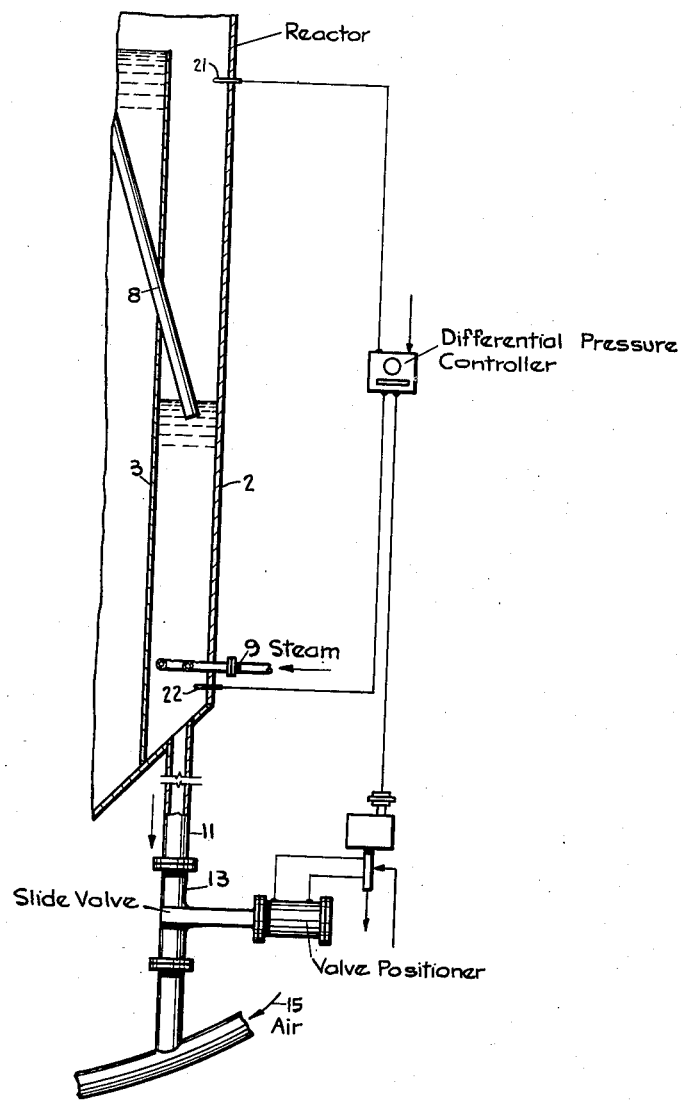
Fig. IV

2,700,641
METHOD AND APPARATUS FOR CONTACTING VAPORS WITH FLUIDIZED SOLIDS

Charles A. Rehbein, New York, N. Y., assignor to Shell Development Company, Emeryville, Calif., a corporation of Delaware Application February 12, 1952, Serial No. 271,097

2 Claims. (Cl. 196—52)

This application is a continuation-in-part of my copending application, Serial No. 593,625, filed May 14, 1945, now U. S. Patent No. 2,606,863.

The invention relates to an improved apparatus and method for contacting vapors with fluidized finely divided solids, and, in particular, to the catalytic cracking of hydrocarbon oils with fluidized cracking catalyst and the regeneration of the spent cracking catalyst by burning off carbonaceous deposits.

Fluidized catalyst catalytic cracking reactors, whether used to convert an oil or to react off carbonaceous deposits from the fouled catalyst, may be divided into two distinct classes which are known as up-flow reactors and down-flow reactors, respectively. In both types, a vapor, e. g. oil vapor, and finely divided solid are introduced at or near the bottom of a fluidized bed of the solid in the reactor.

In the up-flow type of reactor the vessel is so constructed that an amount of solid equivalent to that introduced near the bottom is continuously withdrawn as a dilute suspension (dilute phase) with the effluent vapors at the top. This suspension, carrying, for example, 30 tons of the solid per minute, is passed to external separating means and the separated solid is then handled in an appropriate manner and finally recycled to the bottom of the reactor.

In the downflow type of reactor carry-over of the solid in suspension in the effluent vapors is held at a minimum and is, consequently, inconsequential. The amount of material carried out of the system in this manner is generally too small to warrant attempts to recover it. In the down-flow type of reactor, the solid is withdrawn by gravity from the dense phase bed within the reactor. The down-flow type of reactor has certain advantages. The present invention relates to an improvement in the design and operation of reactors of this type.

In down-flow reactors, the dense phase catalyst withdrawn from the reactor by gravity would normally contain a considerable amount of the reactant vapors adsorbed on the particles and occluded in the moving mass. In order to avoid a substantial loss of this material and also for other reasons, it is necessary in practice to remove as much of this adsorbed and occluded material as possible. This is done by a so-called stripping step in which the stream of solid being withdrawn is flushed with a stripping vapor such, for example, as steam. In spite of considerable work and considerable practical experience, little is known of the fundamentals of this stripping step. Various designs and alterations have been tried but none have materially improved the efficiency of this important step by any substantial extent. So-called external strippers have been built, but this more costly arrangement has not shown any material advantage over the more conventional internal stripping arrangements, i. e., arrangements wherein the stripping takes place in a so-called stripping zone within the reactor vessel. The present invention relates to apparatus wherein the less costly internal stripping is carried out.

Internal stripping is effected in a part of the reaction vessel zoned from the remaining part of the vessel by a partition or other suitable structure. In one common type of structure, the incoming vapors and solids are introduced into the fluid bed through a central tank arrangement provided with a perforated top and the stripping is effected in the annular space around the side of the tank. In another arrangement, a vertical partition is extended from the bottom of the vessel upward into the fluidized bed of solid. That part of the bed to one side of the partition, and also all of the bed above the level of the top of the partition, is utilized in effecting the reaction and is known as the reaction section or reaction zone, and that part on the other side of the partition and below the level of the top of the partition constitutes the stripping zone. It is obvious that in both of these cases, the volume of the stripping zone, whatever it may be, detracts from the volume of the vessel which otherwise could be utilized for effecting the desired reaction. It is, therefore, the desire to maintain the stripping zone as small as possible and, at the same time to utilize the alloted space as efficiently as possible.

While, as pointed out, little is known about the fundamentals of the stripping operation, it is known that, other conditions being equal, the stripping efficiency increases as the stripping time is increased. Thus, if the stream of the solid is retained in the stripping zone for a longer time while passing a stripping gas through it, it is more effectively stripped. The residence time of the solid in the stripping zone at a given flow of so many tons per hour of the solid depends upon the volume of the stripping zone and upon the density of the fluidized solid in the stripping zone. The maximum residence time is, therefore, obtained with a stripping zone of given volume when the stripping zone is retained completely full of the fluidized solid and the fluidized solid is at its highest applicable density. This condition exists in the designs just described since the stripping zone is below the upper level of the fluidized bed and is in open communication with the main mass of fluidized solid. It would, therefore, be expected that these previously used arrangements should provide the maximum efficiency for a stripping zone of any given volume.

In my copending application, referred to above, I have shown that contrary to expectation, the stripping efficiency can be appreciably increased by a relatively simple expedient which results in decreasing the residence time of the solid in the stripping zone. This improvement which has been applied in commercial practice, and has demonstrated its efficiency is obtained by holding the level of the dense phase (pseudo liquid phase) in the stripping zone below the top of the partition thereby causing the fluidized solid to flow over the top of the partition as water over a dam and fall or rain down to the lower level in the stripping section. In this case, for some unexplained reason, the stripping efficiency is considerably improved even though the space alloted to the stripping zone is not filled with dense phase solid.

In the arrangement shown and described in the said copending application, the stripping zone in which the low dense phase level is maintained is formed by a centrally located open top cylindrical partition which extends by necessity to exactly the top level of the fluidized bed constituting the reaction zone. The method is, however, not restricted to this particular location of the stripping zone.

While the centrally located stripping zone illustrated in my copending application can be used and has been applied commercially, this particular arrangement has a material drawback. It is found in practice that it is virtually impossible with this arrangement to effect good distribution of the reactant vapors over the cross-section of the large annular reaction zone without resorting to a high and costly pressure drop through the grid arrangement. A much more satisfactory arrangement is to construct the stripping zone as an annular zone surrounding the reaction zone. Another more satisfactory arrangement is that in which the partition extends as a chord across the horizontal cross-section of the reaction vessel, thus creating a small stripping zone between the periphery of the vessel and the partition. These more suitable arrangements are applied in the method and apparatus in the present invention.

In the process and apparatus of my present invention, the considerable improvement described in my mentioned copending application is obtained with the better arrangement of the stripping zone just described. I have, however, now found that this arrangement allows further important improvements in the process to be realized, provided that a further simple modification of the design is made. In order to explain the cause and nature of these important further improvements, it is necessary to again refer to the limitations hitherto existing in the reactors of the type in question and to the reasons for these limitations. As mentioned above, in the downflow type of reactor, the solid is withdrawn by gravity from the fluidized bed in the reactor and carry-over of solid with the effluent vapor is undesired and held at a minimum. The carry-over of any appreciable amount of the solid is prevented by passing the vapors through a cyclone-type separator which may be of single stage or multi-stage construction. This separator, for very practical reasons, is within the reactor vessel and is mounted near the top of the vessel. The gas or vapor carrying some solid in suspension enters a suitable opening near the top of the separator and, after taking a spiral path downward, passes upward through a central channel. The solid which is thrown to the wall of the separator during the downward spiral flow collects in the bottom of the separator vessel. In order to return the separated solid to the main mass of the solid and to prevent the separator from becoming quickly plugged with solid, the powder collected at the bottom of the separator vessel is withdrawn by gravity through a so-called dip leg. It is essential that provision be made to prevent gas or vapor from passing up through this dip leg. It is, therefore, essential that the bottom of the dip leg be sealed in some manner against any appreciable entrance of gas and this is usually done by utilizing the liquid properties of the main mass of fluidized solid. Thus, the dip leg is caused to dip into the fluidized bed. In order to obtain sufficient head to cause the separated solid to flow down the dip leg back into the fluidized bed, a dip leg of at least about 8 feet is necessary. (The static head caused by a column of the conventional fluidized cracking catalyst is about 0.24 pound/foot of length.) With this usual arrangement, the bottom of the cyclone separator must, therefore, be at least about 8 feet above the level of the fluidized bed. When the height of the cyclone separator itself (which is appreciable and may be, for example, 15 feet) is added to this, it is seen that the reactor vessel must extend above the fluidized bed level by a very substantial distance, e. g., 20–30 feet. In other words, in downflow reactors of the designs hitherto used, it has been necessary to maintain the level of the fluidized bed well below the top of the reactor vessel. In a cylindrical reactor vessel, there is, therefore, a large unused volume which, if it could be utilized, would accommodate a much larger fluidized bed.

This limitation is removed in the process of the invention by returning the separated catalyst from the cyclone separator to the fluidized bed in the stripping zone where, as explained, a low level is maintained. In order to do this, it is necessary to pass the dip leg of the cyclone separator through the partition which separates the stripping zone from the reaction zone. It then becomes possible to greatly extend the height of the partition to within a short distance of the inlet openings of the cyclone separator. The level of the fluidized bed in the reaction zone is, therefore, increased and this large additional volume becomes utilizable.

It will be seen from the above that according to the present invention a downflow type of reactor is used to obtain the known advantages of this type of reactor. The stripping zone is within the reactor vessel and is located at the outside horizontal periphery of the reaction zone to avoid the difficulties in distributing the reactant hitherto encountered with other designs. The cyclone dip leg is caused to pass through the partition which separates the reaction zone from the contiguous stripping zone and to discharge into the fluidized bed in the stripping zone. The fluidized bed in the stripping zone is retained at a low level thereby allowing the separated solid to pass through the dip leg into the stripping zone and, at the same time, affording the increased efficiency of the stripping step. The height of the partition is increased materially thereby increasing materially the height of the fluidized bed in the reaction zone and the amount of solid that a reactor of given external dimensions can profitably utilize.

The advantages which can be gained by applying the improvements of my invention are very substantial and are as follows: the efficiency of the stripping step is materially increased as shown in my mentioned copending application. Adequate distribution of the reactant vapor over the cross-section of the fluidized reaction zone is obtained with a low pressure drop. For a reactor of given throughput capacity, the height and/or diameter may be materially decreased. This not only represents a large saving in capital cost for the vessel itself, but also in the supporting structure. On the other hand, with a given reactor the throughput capacity may be increased markedly, in some cases twofold. Moreover, by decreasing markedly the vapor space above the fluidized bed in the reactor, the secondary reactions which normally take place in this space are materially reduced. This is particularly advantageous when the apparatus is employed for regeneration of spent catalyst since it materially reduces the problem caused by the phenomenon known as "after burning." After burning is a secondary combustion which is found to take place in the space above the fluidized bed; it is known to be most detrimental to the catalyst.

The principles of the invention will be more clearly understood from the diagrammatic illustrations in the accompanying drawing.

Referring to the drawing, Figure I is a flow diagram in which are indicated the essential relative levels of the fluidized beds in the reaction zones and stripping zones and the positions of the cyclone separators and their dip legs. Figures II and III are diagrammatic illustrations of alternative ways of partitioning the vessels to provide suitable stripping zones and reaction zones.

Referring to the drawing, Figure I, a reaction vessel 1 and regeneration vessel 2 are diagrammatically indicated. These vessels may be of different size and/or design. The reaction zones are separated in each case from their corresponding stripping zones by a partition 3 which extends across the cross-sections of the vessels as chords. Thus, as illustrated in Figure II, the smaller section on the left-hand is the stripping zone and the larger section on the right is the reaction zone. An alternative, and in some respects superior arrangement, is illustrated diagrammatically in Figure III. Here the reaction zone is centrally located and the stripping zone is in the form of an annular zone surrounding the reaction zone.

As illustrated in Figure I, the cyclone separators 4 are built within the vessel and are placed at the top. Two-stage cyclone separators of the conventional design are diagrammatically indicated. Vapors carrying suspended solids enter the first stage of the cyclone separators by tangential inlets 5 and, after passing through the two stages, the vapor is discharged by line 6 substantially free of suspended particles. The powder separated in the two-stages in the cyclones collects in the conical section 7 of the cyclones and is continuously withdrawn by gravity through dip leg 8. Dip leg 8 passes through the partition 3 and discharges into the stripping zone at a low level. As previously indicated, this dip leg must be sufficiently long to cause the separated powder to flow by gravity; from practical experience the minimum length is known to be about 8 feet.

In reactors of the conventional design, i. e., with the cyclone dip leg discharging in the reacton zone, the maximum level of the fluidized bed of catalyst in the reaction zone would be approximately as indicated by the broken lines A, and the partitions 3 would end at this level. By passing the cyclone dip leg 8 through the partition into the stripping zone and holding the level of the fluidized bed in the stripping zone at a low level (below A), the partition 3 can be extended at least 5 feet and, if desired, to within two or three feet of the cyclone inlets. Thus, the level of the fluidized bed can be raised until it actually covers the lower parts of the cyclone separators. The spent catalyst continuously overflows the top of the partition and in doing so rains down to the fluidized bed in the lower section of the stripping zone. As explained above, this feature, for some unexplained reason, improves the stripping efficiency. The increased volume of fluidized catalyst bed that therefore is made available is indicated in the drawing by the cross hatched section of the fluidized bed above the broken line A.

The operation of the system illustrated is otherwise conventional. Thus, steam or other suitable stripping gas is introduced near the bottom of the stripping sections by lines 9 and 10. Stripped catalyst is withdrawn from the respective vessels by standpipes 11 and 12 and, after passing through control valves 13 and 14, are picked up and carried to the reaction section of the opposite vessel by air and oil introduced by lines 15 and 16, respectively. The mixtures are discharged over the cross-sections of the respective reaction zones by means of gas distribution means such as grids, indicated in the drawing by the broken lines 17 and 18.

The path of the main mass of catalyst starting at the control valve 14 is, therefore, as follows: hot, freshly regenerated catalyst is picked up by oil and carried by line 19 as a dilute suspension into the dense phase bed of catalyst in the reaction zone. After becoming partially spent in the reaction zone, the powdered catalyst overflows the top of the partition 3 and, after falling as a dilute phase countercurrent to uprising vapors of stripping gas, it collects in a low level, dense phase bed in the stripping zone. Here it is stripped of adsorbed hydrocarbons by steam introduced by line 9. The spent and stripped catalyst descends as a dense phase of gravity through the standpipe 11 and control valve 13 and is picked up by air and carried as a dilute phase in line 20 to the dense phase bed in the regenerator. After being regenerated in the dense bed, the catalyst overflows the top of the partition and falls as a dilute phase to the dense phase low level bed in the stripping zone of the regenerator. Inert gas or steam is introduced at the bottom of the stripping zone by line 10. The regenerated catalyst stripped of occluded oxygen is withdrawn as a dense phase by the standpipe 12 to complete the cycle.

A minor amount of the catalyst is thrown up above the level of the dense catalyst phase in the respective reaction zones. Most of this catalyst falls back into the dense phase bed and overflows the partition as described. However, some remains suspended in the dilute phase above the catalyst bed. This material is separated from the vapors by the cyclone separators and is returned to the catalyst mass in the dense phase bed in the stripping zone by means of the dip leg 8.

In operation it is essential that the fluidized bed of catalyst in the stripping zone be maintained at a low level which is considerably below the level of the top of the partition. If for any reason the level in this zone should be allowed to rise to the top of the partition, the cyclones would cease to function and the process would become inoperative. In practice it is, therefore, essential that suitable safeguards be provided for automatically controlling the level of the fluidized bed in the stripping zone. A suitable control is described in my above-mentioned copending application and in Figure IV of the accompanying drawing which shows diagrammatically an enlarged section of the right hand side of the vessel 2 of Figure I. As described, the catalyst level in the reaction zone to the left of the partition 3 is higher than normal and equal to the level of the top of the partition, whereas the bed level in the stripping section to the right of the partition 3 is held low. This low bed level is adjusted and then maintained automatically by a differential pressure controller instrument which is connected to be responsive to differences in pressure measured by suitable pressure bulbs 21 and 22 situated well above and below the desired catalyst level, respectively, and is in turn connected to control a suitable valve such as a slide valve in the discharge line in response to changes in the differential pressure between these points. The instrument is connected in such a manner that when the differential pressure falls below a selected point corresponding to the desired level, the valve is moved to a more nearly closed position, and vice versa.

In the plant indicated diagrammatically in the drawing, it will be noted that both the reactor and regenerator operate on the same principle. In this particular circumstance, the control problem is greatly simplified since the level of the fluidized catalyst in the stripping zones is a function of the catalyst inventory. Thus, the desired level is established when the catalyst is charged to the plant (with air via line 20). A small quantity of makeup catalyst is then added from time to time to maintain the inventory and the desired level.

I claim as my invention:

1. In the catalytic cracking of a hydrocarbon oil with a finely divided solid catalyst which is continuously recirculated through a reaction vessel and a separate regeneration vessel and wherein the finely divided solid catalyst which is continuously supplied to the regeneration vessel is withdrawn from the reaction vessel by gravity flow from a fluidized bed of the catalyst in the reaction vessel, the improved method of operation which comprises maintaining a high level of fluidized catalyst bed in the reaction zone, maintaining a low level of fluidized catalyst in a contiguous stripping zone by automatic control of the withdrawal of powder from said stripping zone, separating suspended catalyst particles from the mixed vaporous effluent above said contiguous stripping and reaction zones, passing the thus separated catalyst by gravity flow directly through the upper portion of the catalyst bed in the reaction zone in indirect contact into said low level bed of fluidized catalyst in said stripping zone, the level of fluidized bed in said reaction zone being above the maximum level which allows said separated catalyst to flow by gravity directly to said reaction zone and the level of fluidized bed in said stripping zone being below said maximum level.

2. Apparatus for contacting a gaseous fluid with a continuously renewed bed of finely divided solid in fluidized condition which comprises in combination, a vertically disposed cylindrical vessel with top and bottom closures, a cluster of cyclone-type dust separators concentrically located within said vessel near the top thereof, outlet for dust free fluid from said dust separators, said outlet passing through said top closure, a substantially vertical partition dividing the major volume of said vessel into at least two separate side by side fluid-tight compartments which communicate only above the top of said partition, said partition furthermore dividing the horizontal cross-section of said vessel throughout the greater part of its length into a major and more centrally located reaction area and a minor stripping area located near the outer wall of the vessel, said partition furthermore extending upward from the effective bottom of said vessel to a point well above the center of the vessel but below the inlet ports of said cyclone separators, a line for removing separated powder by gravity flow from said cyclone type separators, said line depending from said separators and extending through said partition to discharge in the said minor stripping area at a point below the top of said partition, fluid distribution means located near the bottom of said compartments, inlet and outlet lines communicating with said major reaction area and minor stripping area, respectively, below said fluid distribution means, and means for automatically controlling the rate of withdrawal of fluidized powder through said outlet line to maintain a level of fluidized bed in said stripping area below the level of the top of said partition.

References Cited in the file of this patent

UNITED STATES PATENTS

| 2,327,175 | Conn | Aug. 17, 1943 |
| 2,514,288 | Nicholson | July 4, 1950 |
| 2,541,186 | Anderson | Feb. 13, 1951 |
| 2,650,155 | Medlin | Aug. 25, 1953 |